No. 827,748. PATENTED AUG. 7, 1906.
T. H. O'BRIEN.
TICKET OR TAG.
APPLICATION FILED JULY 24, 1905.
3 SHEETS—SHEET 1.
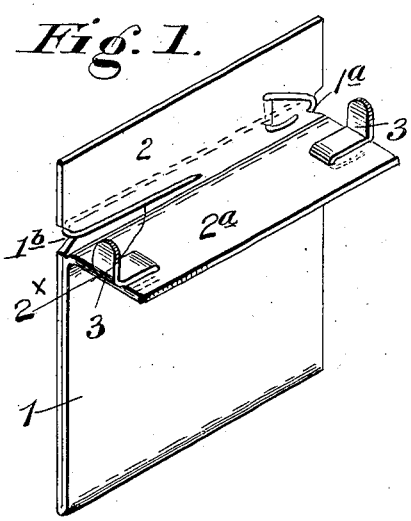
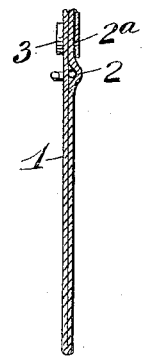
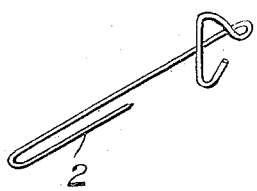
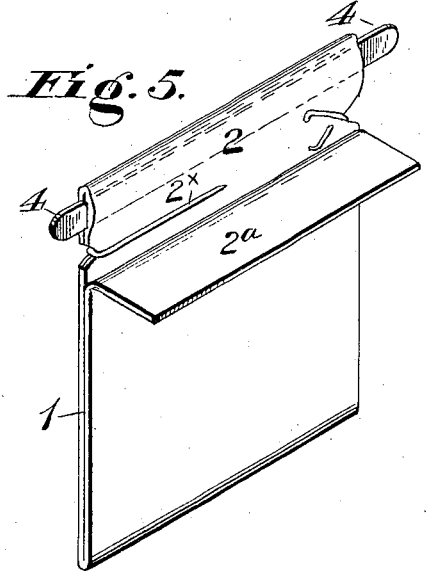
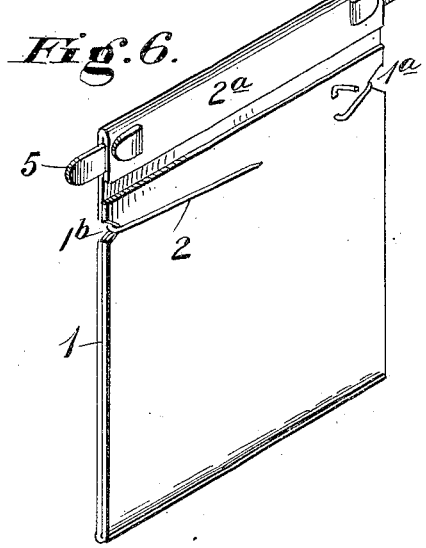
Witnesses:
Inventor:
Thomas H. O'Brien,
By Louis Bagger & Co.
Attorneys No. 827,748. PATENTED AUG. 7, 1906.
T. H. O'BRIEN.
TICKET OR TAG.
APPLICATION FILED JULY 24, 1905.
3 SHEETS—SHEET 2.
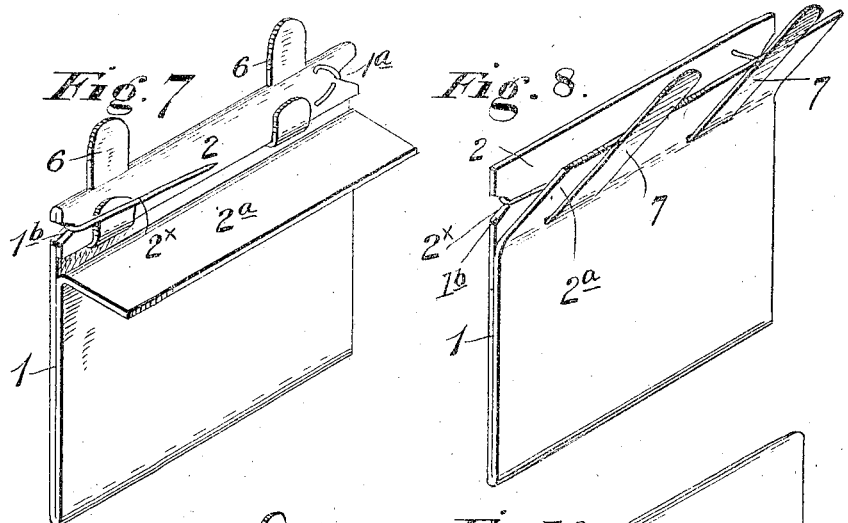
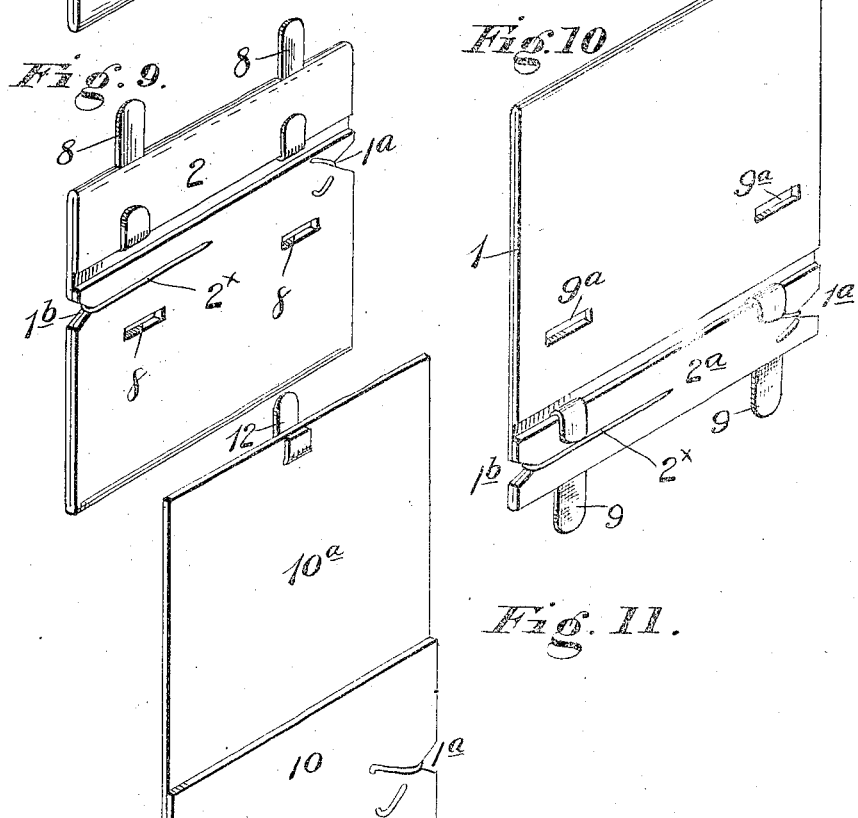
Witnesses:
H. T. McKeever
L. L. Burket
Inventor:
Thomas H. O'Brien,
By Lewis Bugger & Co.
Attorneys

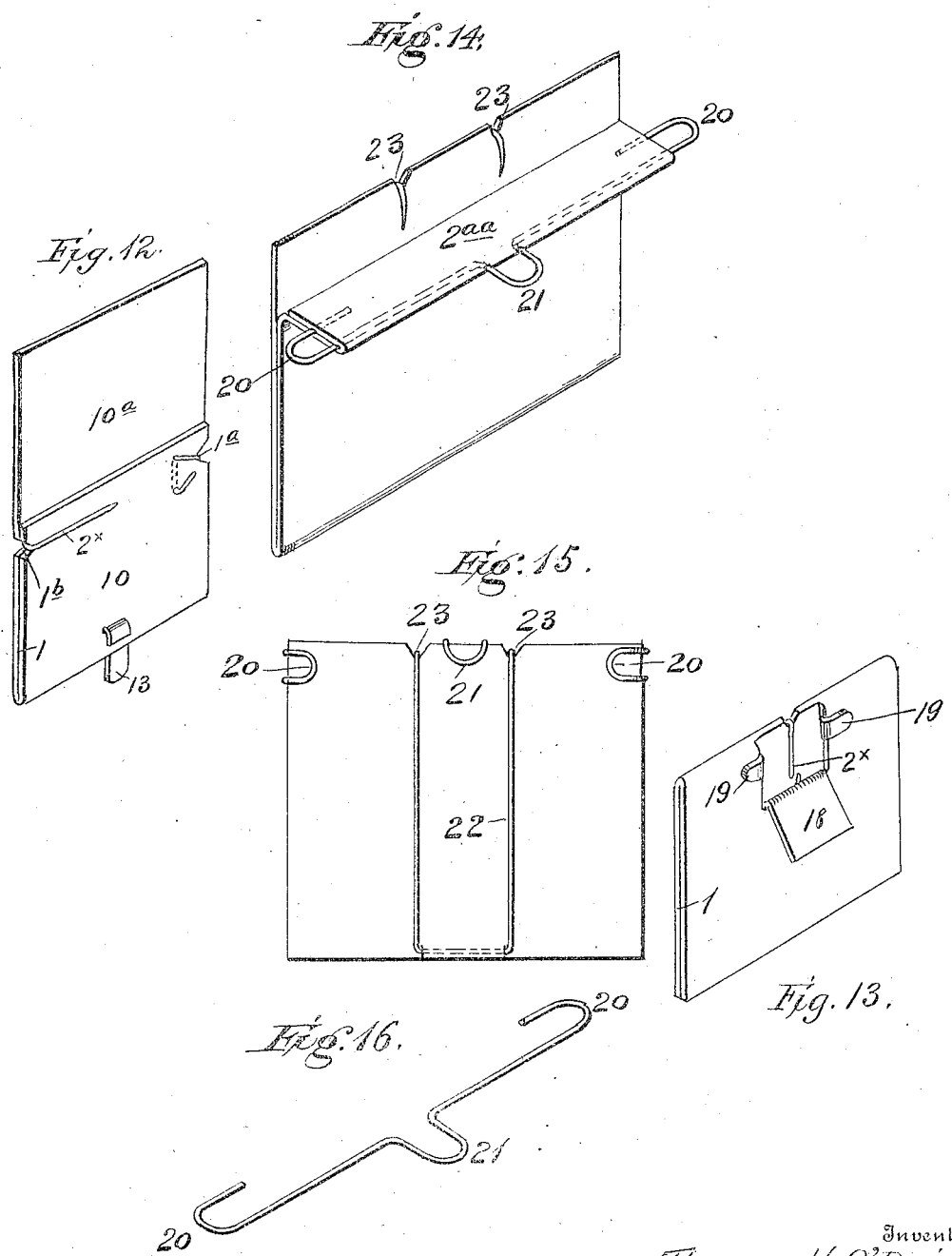

UNITED STATES PATENT OFFICE.

THOMAS H. O'BRIEN, OF FOND DU LAC, WISCONSIN.

TICKET OR TAG.

No. 827,748. Specification of Letters Patent. Patented Aug. 7, 1906.

Application filed July 24, 1905. Serial No. 271,072.

*To all whom it may concern:*

Be it known that I, THOMAS H. O'BRIEN, a citizen of the United States, residing at Fond du Lac, in the county of Fond du Lac and State of Wisconsin, have invented new and useful Improvements in Tickets or Tags, of which the following is a specification.

My invention relates to improvements in tags or tickets particularly adapted to be affixed to dry goods in the piece or roll.

It has for its object to provide for the ready attaching or affixing to the goods of the tag or ticket and in such manner as to guard against the points of the attaching or affixing pin or fastening pricking or contacting with the hands.

To these ends the invention consists of certain structural features, substantially as hereinafter fully disclosed, and particularly pointed out by the claims.

In the accompanying drawings, illustrating the preferred embodiment of my invention, Figure 1 is a perspective view of the invention with the pin-concealing flap or guard of the tag or ticket in unfastened position. Fig. 2 is a vertical sectional view with the flap or guard fastened over the ticket securing or holding pin. Fig. 3 is a detached perspective view of the tag or ticket attaching pin or fastening. Fig. 4 is a horizontal section produced through the pin-equipped end of the tag or ticket about in line with the pin. Figs. 5, 6, 7, 8, 9, 10, 11, 12, 13, 14, 15, and 16 are views of sundry modifications which deal with different structural details of the pin and of the ticket or tag for the guarding of the fastening-pin, especially at its point or points, as presently more fully explained.

In the carrying out of my invention I contrive a tag or ticket 1 of peculiar structure and equip it with a pin or fastening 2$^\times$ for attaching or affixing it to the piece or roll of dry goods or other object it may be desired to mark or identify. Said ticket or tag is preferably of a double thickness of some suitable stiff fibrous material—as, for instance, cardboard, pasteboard, or the like—upon which may be placed the required data or memoranda, as well understood, with the attaching pin or fastening 2$^\times$ applied thereto, preferably as shown, having its point or piercing end brought to the front after the passing of the pin bodily through the goods upon the rear side of the ticket or tag. It will be noted that the "head" end of the pin is interlooped or connected with the ticket or tag and let into a notch 1$^a$ in a lateral edge thereof, while it is bent, in bringing its point around to the front, into a like notch 1$^b$ in the opposite lateral edge of said ticket to prevent liability of its being accidentally caught upon any otherwise contacting object and thereby being displaced. One thickness of the ticket or tag 2 is left unattached from the other portion or thickness thereof a short distance from its upper end, opposite the attaching-pin or fastening, thus providing a flexibly-connected flap or guard 2$^a$, itself thickened up by folding upon itself, effectively for isolating or concealing the pin or fastening, where otherwise the point of the latter would be exposed, and consequently be liable to contact with and puncture or pierce the hands in handling the goods bearing the tag or ticket. Said flap or guard 2$^a$ is equipped with laterally-projecting readily-bent strips or pieces of metal, of ductile or pliable character, forming clips or fastenings 3 at the side edges of said flap or guard for bending over the corresponding edges of the opposite portions of the ticket and upon the back thereof, thus detachably holding said flap or guard over the tag or ticket attaching pin, and whereby by detaching said clips from said ticket-back said flap may be readily thrown back to permit access to the pin for its removal, with the ticket or tag, from the goods when required.

In the modifications as disclosed by Figs. 5, 6, 7, 8, 9, and 10 it is noted that the departure lies practically in the variations of the clip-fastenings for the guard or flap, Fig. 5 showing the clips formed of a continuous end projecting plate or strip 4 inserted into an end looped portion of the ticket; Fig. 6, duplicate end projecting clips 5 with their inner ends folded or clamped down upon the inner surface of the flap, in this case, however, the flap folding over upon the body of the ticket; Fig. 7 showing clips 6 projecting through and beyond the top edge of the ticket-body and clamped upon the flap, Fig. 8 showing a like arrangement of clips 7 applied laterally or to the outside of the flap and in like manner engaging or clasping the ticket-body, Fig. 9 showing still a like arrangement of clips 8 arranged to project through and beyond the flap, in this instance said flap lying flat upon the ticket-body and the clips engaging apertures or holes 8$^a$ in the ticket-body, and Fig.

10 showing also a like arrangement of clips 9 with the flap inversed in its position, the same folding down flat upon the opposite side of the ticket-body and said clips engaging holes or apertures 9ª therein.

In the modifications as shown by Figs. 11, 12 the predominant feature of difference exists in doubling the material upon itself in forming the ticket-body and flap or guard, as at 10 10ª, Fig. 11 showing in addition two fastenings or pin connections 11ª between the ticket and the goods bearing the same, while in Figs. 11 and 12 clasps 12 and 13 are applied to opposite edges of the ticket-body and the flap, respectively, one clasp projecting from between the double thickness of the body portion and the other clasp projecting from the outside of the flap.

In the modification as disclosed by Fig. 13 is shown a flap 18, produced by suitably slitting one thickness of the ticket or tag, and partially inserted or embedded within other thicknesses of the latter is a clasp or clip 19 with its ends projecting therefrom and adapted to be folded or clamped over upon said flap 18.

In the modification as suggested by Figs. 14, 15, and 16 are disclosed end or lateral clasps 20 and a central top edge clasp 21 for the flap 2ªª, all of said clasps in this instance being produced of highly flexible wire and in continuation one of the other, with the intermediately connecting portions thereof buried or embedded between thicknesses of said flap. Said top and lateral clasps 20 21 are adapted to be bent over the edges of the tag and around and down upon the back of the latter, as in the case of the clasps in Figs. 1, &c., in securing the flap in effective position. Also herein is shown a tag attaching or affixing pin or staple 22 with its head or the connecting member between its pointed arms or limbs buried or embedded between thicknesses of the tag proper at the bottom edge thereof, while said arms or limbs extend in line parallel with and along the back of said tag proper from top to bottom. After passing said pointed arms or pin members through the goods or article for labeling their ends or points are bent over the top edge of the tag proper within notches 23 therein and down upon the opposite or front side thereof, whence they may be isolated by the folding thereover of the flap, as will be readily understood from the foregoing.

Thus it will be noted that the clasps for securing the flap over the attaching pin point or points may be produced of sheet metal or wire. Accordingly my invention is not restricted in that particular.

I claim—

1. A tag or ticket of the character described, having a retaining-pin-concealing flap or guard and a clip or clasp effecting connection between said flap and the tag-body for securing the flap over the retaining-pin.

2. A tag or ticket of the character described, having a flexibly-connected flap or guard effective to isolate its attaching-pin and equipped with a clip or clasp adapted to engage the ticket-body for securing said flap or guard to the latter, over said fastening.

3. A tag or ticket of the character described, formed of a piece of suitable material doubled upon itself to form a body portion and flap, means for its attachment for use, and a clip or clasp effecting connection between said flap and the tag-body for securing said flap over said means of attachment.

4. A tag or ticket having a flap or guard provided with a clip or clasp and an affixing-fastening, of staple-like outline and effective for attachment to the tag and for insertion through the goods or article for labeling, and capable of being bent or returned upon the tag said clip or clasp adapted to secure said flap to the tag-body, over the points of said fastening.

5. A tag or ticket of the character described, having a flap or guard provided with lateral clasps or clips for engaging the tag-body and formed of a continuous piece also having an intermediate clasp for engaging the upper edge of said tag-body, and a staple-like securing-pin or fastening for engaging the goods or object, said flap overlying the points of said fastening and said lateral clasps or clips securing said flap in such position.

In testimony whereof I affix my signature in presence of two subscribing witnesses.

THOMAS H. O'BRIEN.

Witnesses:
F. W. CHADBOURNE,
TESSIE NORMILE.